No. 777,813. PATENTED DEC. 20, 1904.
C. R. SHAFFER.
CARPET FASTENER.
APPLICATION FILED MAR. 7, 1904.
NO MODEL.
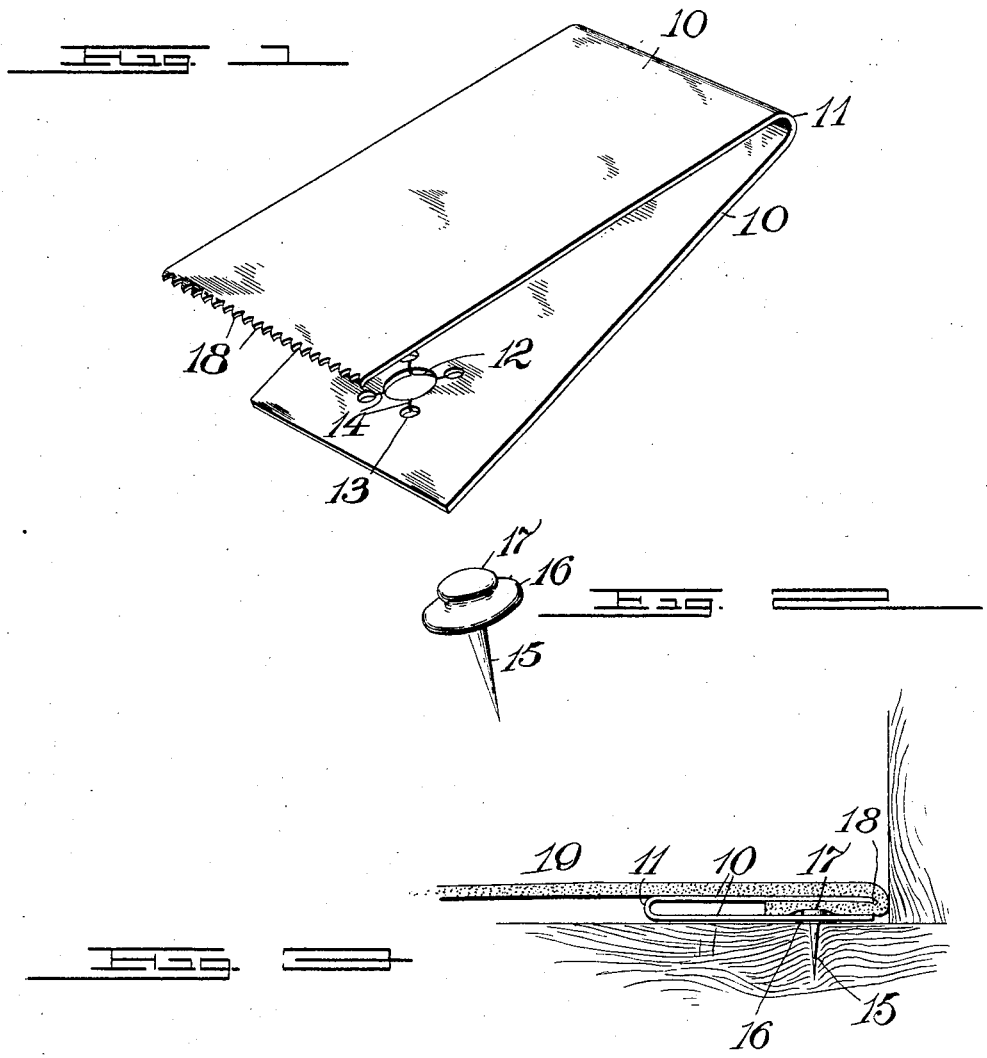
WITNESSES:
Wm H. Camfield
John T. Carolan
INVENTOR
Charles R. Shaffer
BY
W. B. Hutchinson,
ATTORNEY.

No. 777,813. Patented December 20, 1904.

UNITED STATES PATENT OFFICE.

CHARLES R. SHAFFER, OF EUREKA, CALIFORNIA.

CARPET-FASTENER.

SPECIFICATION forming part of Letters Patent No. 777,813, dated December 20, 1904.

Application filed March 7, 1904. Serial No. 196,883.

*To all whom it may concern:*

Be it known that I, CHARLES R. SHAFFER, of Eureka, in the county of Humboldt and State of California, have invented a new and Improved Carpet-Fastener, of which the following is a full, clear, and exact description.

My invention relates to improvements in carpet-fasteners; and the object of my invention is to produce a cheap and simple device which can be quickly and easily laid to a floor and attached to a carpet or rug and which will serve to hold the carpet or rug in better shape than will the ordinary tack.

Another object of my invention is to produce a device which is simple enough to enable any ordinary person to apply it properly to the article which is to be fastened to the floor.

With these ends in view my invention consists of a carpet-fastener the construction and arrangement of which will be hereinafter described and the novel features claimed.

Reference is to be had to the accompanying drawings, forming a part of this specification, in which similar figures of reference indicate corresponding parts in all the views.

Figure 1 is a perspective view of my improved fastener. Fig. 2 is a perspective view of the tack or nail which is used in securing the fastener to the floor, and Fig. 3 is a detail elevation showing how the fastener is applied to the carpet.

The body portion of my fastener consists of a flexible strip 10 of metal, which is preferably bent or doubled transversely in the center, as shown at 11, although the strip may be made straight and then doubled over when it is to be used, if preferred. The strip when doubled is thus formed into two members, the under one of which has at a point preferably near the edge a socket or hole 12 to receive the nail or other fastening means hereinafter referred to, and in order that the socket may be in the nature of a spring-socket small holes 13 are made through the material of the fastener at points around the main socket or hole 12, and an incision 14 is made through the material between the large hole and the smaller holes. This causes the material around the hole 12 to yield sufficiently for the socket to be pushed on over the nail-head, as presently described, and to spring into engagement with the shank of the head, so as to hold the body portion of the fastener in place. It will be understood that if a wider strip is used more of these sockets or holes can be provided.

For securing the fastener in place I use, preferably, a nail 15, though a screw could be used, and by the term "nail" I mean to include any means of securing the engaging head to the floor. The tack or nail 15 has a rigid collar 16 thereon, above which is a head 17. It will be seen that the lower member of the fastener may be pushed on over the head 17 by entering the latter in the socket or hole 12 and that in this way the fastener is held securely to the floor. The free edge of the upper member of the fastener terminates in serrations 18, and the teeth are given, preferably, a downward curve. These teeth may be dispensed with; but they are preferably used, as they engage the carpet and prevent it from slipping.

When the device is to be used, the nail 15 is driven into the floor at a point near the edge of the carpet, and as many of the nails are driven as there are fasteners to be used. Each fastener is then secured to the nail as already described. The carpet 19 has its edge doubled over the upper member of the fastener, so that the doubled edge of the carpet will extend between the two members of the fastener, as shown clearly in Fig. 3, and the carpet and the upper member are then squeezed down tightly to place, with the result that the carpet is stretched taut and is securely held.

It will be noticed that when the carpet is laid it can be easily taken up without removing the nails or tacks and as easily put back, and this is a very important matter, as it enables the carpet to be easily cleaned when necessary.

Having thus fully described my invention, I claim as new and desire to secure by Letters Patent—

1. A carpet-fastener, comprising a flexible metallic strip adapted to bend in the middle to form two members, a socket in the lower member consisting of a hole through the member and radial slots in the wall of the hole to give the walls a spring action, and means on the free edge of the upper member to engage the carpet.

2. A carpet-fastener, comprising a flexible metallic strip adapted to bend in the middle and form two members, and a socket in the lower member to engage a nail-head, said socket being formed of a hole through the lower member, and radial slots in the wall of the hole so as to give to the said wall a spring action.

3. The combination with the metallic strip formed of two overlapping members, the lower of which has a perforation with slit walls to make the said walls springy, of a fastening-nail having a collar to abut with the bottom of the lower member of the fastener, and a head constructed to project into the aforesaid socket.

CHAS. R. SHAFFER.

Witnesses:
A. C. NOE,
E. E. LAUGHLIN.